United States Patent [19]

Dobras

[11] 4,074,114
[45] Feb. 14, 1978

[54] BAR CODE AND METHOD AND APPARATUS FOR INTERPRETING THE SAME

[75] Inventor: Bruce W. Dobras, Dayton, Ohio

[73] Assignee: Monarch Marking Systems, Inc., Dayton, Ohio

[21] Appl. No.: 666,569

[22] Filed: Mar. 12, 1976

[51] Int. Cl.$^2$ .......................... G06K 7/10; G08C 9/06; G06K 9/00; G06K 10/06
[52] U.S. Cl. .................................. 235/463; 250/555; 250/566; 340/146.3 F; 340/146.3 Z; 235/494
[58] Field of Search ................ 235/61.11 E, 61.12 N; 250/555, 566, 567, 568, 569; 340/146.3 Z, 146.3 F

[56] References Cited

U.S. PATENT DOCUMENTS

| | | | |
|---|---|---|---|
| 3,858,032 | 12/1974 | Scantlin | 235/61.11 E |
| 3,976,973 | 8/1976 | Martin et al. | 235/61.11 E |
| 3,979,577 | 9/1976 | Seligman | 235/61.11 E |

*Primary Examiner*—Daryl W. Cook
*Attorney, Agent, or Firm*—Mason, Kolehmainen, Rathburn & Wyss

[57] ABSTRACT

A bar code is constructed from individual characters that are laid out along a first straight line. Each character is formed by a series of bars and spaces that are parallel to the first straight line and that are laid out along a second straight line which is perpendicular to the first straight line and which passes through the center of the character. The resulting bar code is scanned manually by an operator who propels a hand-held scanner across the bar code in a direction parallel to the first straight line. The hand-held scanner contains a linear photodetector array mounted opposite optical elements in such a manner that a line image of a bar code character roughly perpendicular to the first straight line is projected upon the linear array as the stylus passes over a character. As the bar code is manually scanned, the linear array scans through each bar-coded character at numerous points and thereby generates numerous sets of digital data each representing the width of the successive bar and space regions which comprise each character. The resultant digital data is filtered, decoded and error-checked. When a series of consecutive scans over a given character result in the detection of identical error-free data, that data is accepted as a proper representation of the given character and is forwarded to a data capturing device. The scanning then commences to look for bar space patterns indicating that the scanning has progressed to the region which separates adjoining characters from each other. Then the scanning for data recommences. In this manner, a single pass of the hand-held scanner over the bar code results in the accurate capture of the data represented by the code without the necessity of multiple passes over the ticket.

29 Claims, 11 Drawing Figures

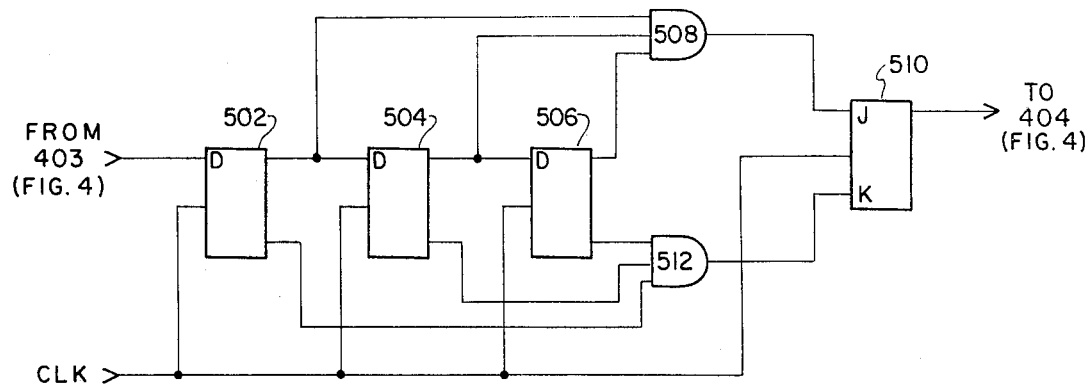
FIG. 5 SPOT AND VOID FILTER 500
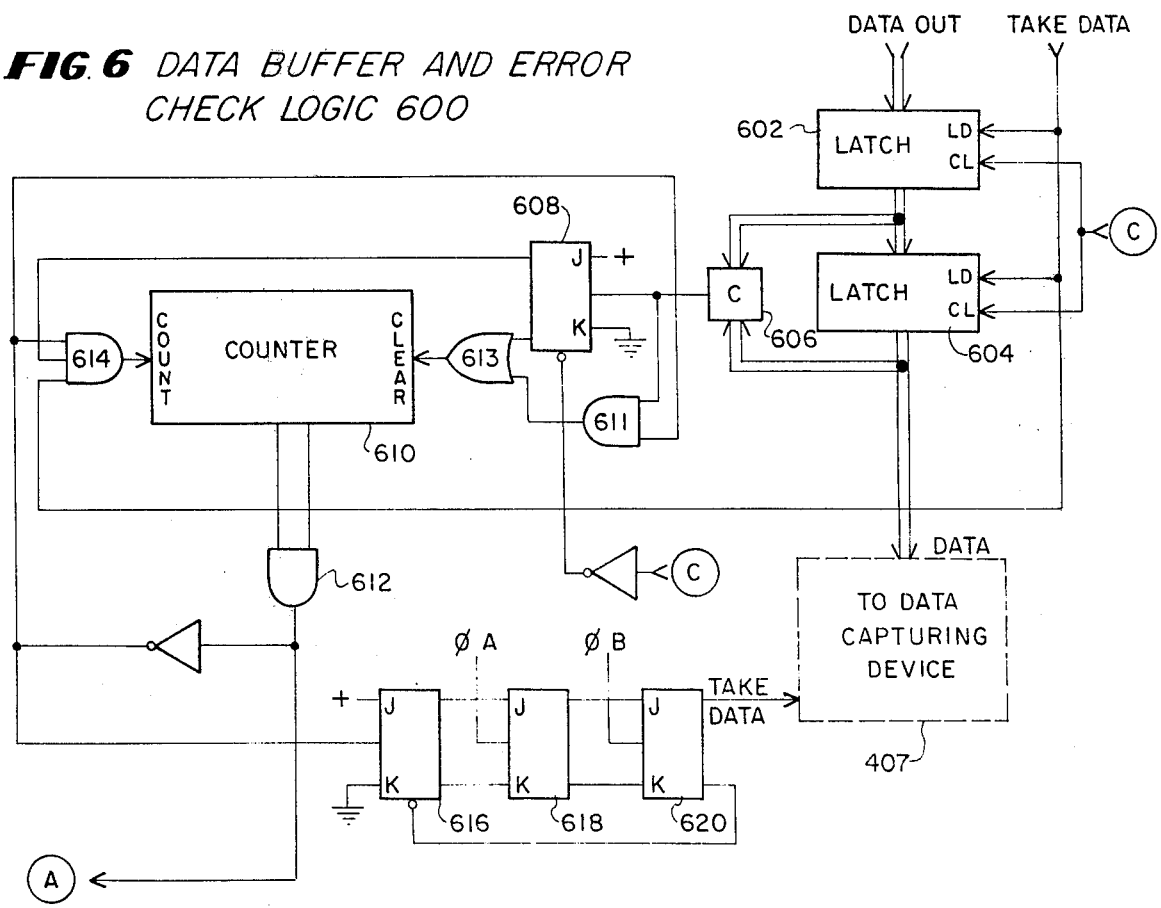
FIG. 6 DATA BUFFER AND ERROR CHECK LOGIC 600

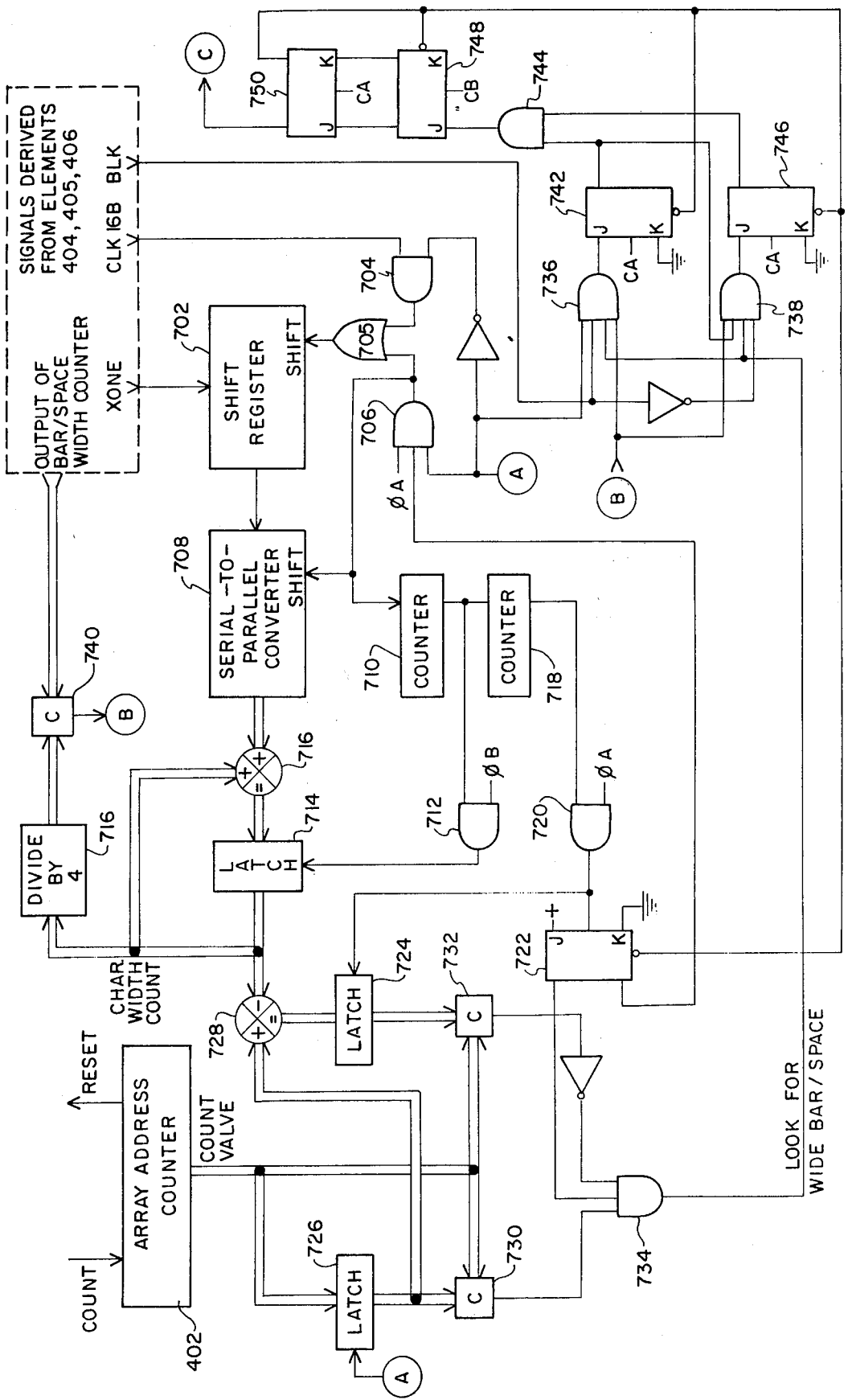
FIG. 7 CHARACTER RANGE LOGIC 700

BAR CODE AND METHOD AND APPARATUS FOR INTERPRETING THE SAME

BACKGROUND OF THE INVENTION

1. Field of the Invention

The present invention relates to information bearing bar codes, and more particularly, to bar codes of the type which are arranged to be optically scanned by means of a hand-held light pen or wand. It is a primary object of the invention to provide a new and improved bar code arrangement wherein individual characters of the bar code are extremely small and may be detected by means of a decoding arrangement which is substantially independent of the manual scanning speed with which the light pen is moved over the label or ticket containing the bar code, while at the same time providing an arrangement wherein the code may be accurately scanned without repeated passes over the label and with a minimum of substitution and transposition errors.

2. Brief Description of the Prior Art

It is well known to use an optical scanner to capture data from a bar code. Typically, the optical scanner includes a source of illumination and a photodetector. The scanner is manually drawn across a bar code comprising a series of variable-width bars and spaces. During the scan, apparatus is provided to measure the time which it takes the optical scanner to pass over each bar and space within the code. The resulting series of time measurements correspond roughly to the width of the bar and space elements of the code and may be decoded to represent the data content of the code. Such a system is disclosed in U.S. Reissue Pat. No. Re. 28,198 which issued to the present inventor on Oct. 15, 1974.

Systems of the type just described have come into relatively widespread use. They are used, for example, to bar code price tags at the checkout counters of department stores and also to read inventory labels in automated industrial inventory-control systems. Customarily, the bar code is printed in association with a human readable set of characters so that the purchaser can himself identify the price, and other information associated with the article bearing the label.

While these systems are satisfactory for their intended purposes, the individual who handles the scanning stylus must be careful to draw the tip of the stylus directly over the printed bar code from one end of the code to the other. If the stylus slips off the edge of the bar code, then the data is not read correctly. Similarly, if dirt spots, gouges, or other irregularities are scanned, data is not normally collected and the scan must be repeated. Accordingly, it is sometimes necessary to scan the same bar code a number of times before the encoded data is properly read.

Also, with conventional bar code readers it is also necessary to have the length of the bars several times the height of the accompanying characters which are human readable so that the bar code occupies a relatively large space and requires a relatively large label.

Since the velocity with which the tip of the stylus moves over the printed bar code varies with different operators, the time taken to pass over each bar and space may vary over quite wide limits. In order to correct for such velocity changes, it is customary to store all of the digits of a particular character and from such storage determine through suitable logic the actual width of the bars and spaces. While various arrangements have been proposed for such velocity correction, all of them require additional logic and the storage of a large number of bits of information, all of which increases the complexity of the decoding apparatus. It would, therefore, be desirable to provide a scanning arrangement wherein the decoding of the bar code is independent of the velocity with which the manual scanner is drawn over the bar code.

Various other arrangements have also been heretofore proposed for scanning labels at constant velocity wherein a moving label is scanned by a rotating mirror, or the like. Such arrangements are shown, for example, in Stites et al U.S. Pat. No. 3,225,177 and Wolff U.S. Pat. No. 3,744,026, but are unsuitable for adaptation to hand-held scanning units due to the size, weight and complexity of such arrangements.

In addition to the above described bar code readers, it has also been proposed to provide only human readable characters on the label which are read directly by means of a hand held scanning unit. These arrangements have employed a photoelectric cell matrix on which is optically focused each OCR character as the scanner unit is moved across the label. Each character is compared with a series of masks corresponding to the characters to be recognized and when the scanned data corresponds to a particular mask, entry of the corresponding character is made. Such an OCR type of hand held scanning arrangement requires a relatively complex decoding arrangement for scanning the matrix in both horizontal and vertical directions and in order to provide a system which is not too expensive, the number of characters which can be recognized is limited to approximately twenty-one, so as to simplify the character recognition decoding process. The use of only twenty-one characters severely limits the clarity with which a message may be encoded by this method since a large proportion of characters are required for numbers, thus leaving only a few letters to convey the remaining desired information in human readable terms. Furthermore, the degree of skew which the hand scanner may assume with respect to the scanning path is severely limited in such OCR readers and a maximum skew limit of eight degrees may, in some instances, be required. Also, since the photoelectric cell senses the label over a substantial area and hence over a substantial width along the scanning path, the hand-held scanner unit must be maintained perpendicular to the plane of the label as the scanning operation is performed since otherwise portions of the light pattern striking the matrix will become defocused and reduce the reliability of detection of the character. As a result, the geometry and accuracy of printing which is to be read by such OCR hand scanners must be held to a very close tolerance. In addition, there is no way for the OCR reader to detect that an improper substitution has been made in the decoding process. Thus, if due to voids or smears in the printing operation a "2" becomes damaged so that it is read as a "3", there is no detection of this error and the wrong price may be decoded. Furthermore, since these voids and smears may be extremely small the operator who is using the hand scanner cannot visually detect the damage and hence is unaware of the substitution error.

Systems of the type just described have come into relatively widespread use. They are used, for example, to bar code price tags at the checkout counters of department stores and also to read inventory labels in automated industrial inventory-control systems. These systems are highly satisfactory. However, the individual who handles the scanning stylus must be careful to draw the tip of the stylus directly over the printed bar code from one end of the code to the other. If the stylus slips off the edge of the bar code, then the data is not read correctly. Similarly, if dirt spots, gouges, or other irregularities are scanned, data is not normally collected and the scan must be repeated. It is sometimes necessary to scan the same bar code a number of times before the encoded data is properly read.

BRIEF SUMMARY OF THE INVENTION

It is, therefore, an object of the present invention to provide a new and improved bar code system which eliminates one or more of the data discussed disadvantages of prior art arrangements.

It is another object of the present invention to provide a new and improved bar code system that is less sensitive to the positioning of the stylus relative to the code than prior arrangements.

It is still another object of the present invention to provide a new and improved bar code system in which a hand scanner unit is manually moved across the different bar code characters and decoding is substantially independent of the velocity of such manual scanning.

It is also an object of the invention to provide a scanning apparatus which can capture all the data encoded into a bar code in a single pass of the stylus. Additional objects of the invention are to provide a bar code and scanning system that are considerably less sensitive to the occurrence of minor defects in the bar code than are conventional systems and that are also more insensitive to variations in the speed at which the bar code is scanned by the stylus — particularly to sudden changes in the speed of scanning. Desirably, the scanning system should be capable of capturing the encoded data regardless of how fast or slow the scan may be, unlike conventional arrangements which require a swift, relatively steady scanning motion that is not too fast.

Briefly described, the present invention contemplates providing a system in which the individual encoded characters are each scanned repeatedly by a light-sensing linear photodetector array which is arranged to scan in a direction perpendicular to the direction in which the hand-held stylus is moved. Preferably, the photodetector array is arranged to scan repeatedly across regions containing successive bars and spaces while the manual scanning motion moves the photodetector array from one character to the next. This system has the significant advantage over prior bar code hand scanning arrangements that the speed of scanning in a direction perpendicular to the bars and spaces is determined by the speed at which the linear photodetector array is electronically scanned and not by the speed of the manual motion of the hand-held stylus.

In accordance with the preferred embodiment of the invention, each individual character which is to be encoded is represented by a series of width-modulated bars and spaces which are vertically stacked with the bars and spaces all horizontal. The bars and spaces used to represent different characters within a message are displaced from one another horizontally and a vertically extending bar which joins all of the horizontal bars at one edge thereof is employed to facilitate separation of characters. A hand-held stylus is then moved horizontally across the characters and contains a light source, a linear photodetector array and suitable optics for focusing light reflected from a single vertical line in the label or ticket so that all elemental areas along this line simultaneously energize the linear array of photodetectors. An electronic scanning arrangement is employed to develop a pulse type output in which each pulse corresponds to one of the photodetectors in the linear array and the amplitude of each pulse is proportional to the amount of light striking that photodetector. Accordingly, the speed of the stylus horizontal motion has vertually no effect upon the interpretation of the code, since the relative positioning of the photodetectors along said vertical line is fixed and the pulses are generated at fixed intervals dependent only on the electronic scanning rate and not on the manual horizontal motion of the stylus.

The linear photodetector array may be a charge-coupled device of conventional design or any equivalent device. Preferably, the array should be self-scanning, as is conventional in such devices, so that the array generates an amplitude modulated pulse type signal representing the pattern of light and dark patches along the vertical line which is scanned. Preferably, the vertically stacked bars and spaces occupy relatively little space vertically and have a height approximately one-third to one-fourth that of conventional bar codes. Also, the length of these vertically stacked bars may be quite small since the rate at which the linear array of photodetectors are scanned electronically can be sufficiently high that each character is scanned many times at normal velocity of the hand-held scanner even with relatively short bars. Accordingly, the total area for each character is much smaller than that of previous hand scanned bar codes and each character may occupy a space equivalent to an OCR character so that extremely small labels may be produced in accordance with the present invention.

The output signal generated by the array is processed to eliminate signal fluctuations which are characteristic of small spots and voids by means of a special digital filter. The resultant digitized and filtered signal may then be analyzed to detect the presence of bar and space combinations which correspond to a valid character. The system is preferably set up so that a series of consecutive scans must always result in the detection of the same character before the scans are accepted as a valid reading of an encoded character. In this way, a high degree of assurance is given that the data captured is correct. The use of a spot and void filter in conjunction with the scanning of each character at many different points insures that in almost every case a valid reading of each character is assured.

Further objects and advantages of the invention are apparent in the detailed description which follows. The points of novelty which characterize the invention are pointed out with particularity in the claims appended to and forming a part of this specification.

BRIEF DESCRIPTION OF THE DRAWINGS

For a better understanding of the invention, reference will be made to the drawings wherein:

FIG. 5 is a logic diagram of the spot and void filter shown as a block element of FIG. 4;

FIG. 6 is a logic diagram of the data buffers and error-check logic which appear together as a single block element of FIG. 4;

FIG. 7 is a partly block and partly logic diagram of the character range logic which appears as a block element of FIG. 4;

DETAILED DESCRIPTION OF THE PREFERRED EMBODIMENT

Figure 8:
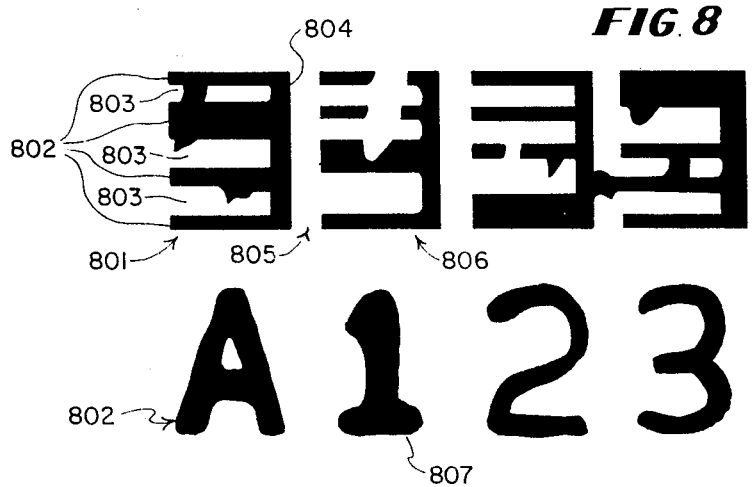
FIG. 8 is an illustration of a typical encoded message using a bar code in accordance with the preferred embodiment of the present invention and including a variety of voids, ink spots and other irregularities.

With reference to FIG. 8, the preferred embodiment of the present invention contemplates providing a bar code in which the bars and spaces used to represent each character are oriented vertically, as shown, and in which the bar and space combinations used to represent different characters are spaced from one another horizontally. In FIG. 8, for example, the letter A is represented by a series of bars 802 and spaces 803 which comprise a bar-encoded character 801. The bars 802 and spaces 803, whose relative widths represent the letter A, are stacked vertically — one on top of another — such that one wishing to decode the information represented by the bars and spaces must scan them in a vertical direction, either upwards or downwards. The letter "A" itself is shown at 802 printed directly below the bar-encoded character 801. It is noteworthy that the bar-encoded character 801 is just as compact as the printed letter "A" at 802. In prior art arrangements, it has been customary to utilize vertical bars and spaces and to have the length of the bars and spaces be four to five times the length of the corresponding printed letter or numeral to make it easier for the bars and spaces to be scanned by means of a hand-held stylus. The present invention obviates the need to have the bars and spaces extended to such lengths.

At the righthand edge of the horizontal bars 802 and spaces 803, a single vertical bar 804 is provided which connects to each of the bars 802 to give the resultant bar-encoded character 801 an appearance which roughly resembles a backwards letter "E" containing an extra horizontal stem. A vertical space 805 is left between the adjacent characters 801 and 806. Directly beneath each of the bar encoded characters 801, 806, etc. are the corresponding human readable characters 802, 807, etc. which are laid out as shown so that they may be easily read. The bar-encoded and human readable characters may be printed or typed simultaneously, if desired, and the spacing between adjacent characters is not critical.

Figure 1:
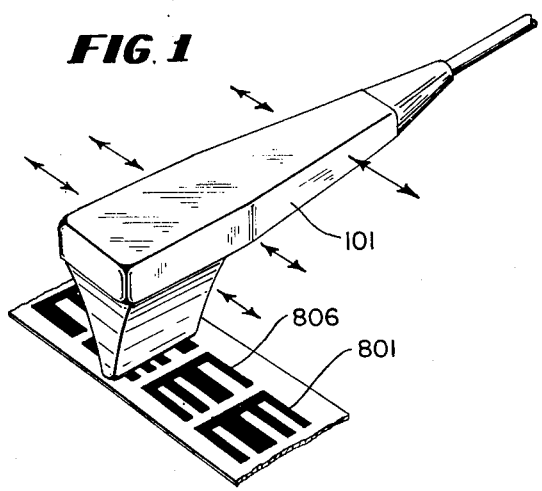
FIG. 1 is a perspective view of a scanning stylus designed in accordance with the preferred embodiment of the invention and suitable for manual scanning — the stylus is shown scanning a bar code that is also in accordance with the preferred embodiment of the invention.

In accordance with one aspect of the present invention, it is contemplated that a stylus 101 (FIG. 1) is to be provided which may be drawn horizontally by hand across bar-encoded characters of the type shown in FIG. 8. Within the scanner 101 there is mounted a linear array of photodetectors which are shown at 301 in FIG. 3. This array is of a conventional type. For example, it may be the Model CCD101 solid state linear image sensor 500-element charge-coupled device which is presently obtainable from the Fairchild Semiconductor Components Group of the Fairchild Camera and Instrument Corporation, 464 Ellis Street, Mountain View, Calif. This device includes an array of 500 photodetectors arranged in a row to sense light which is projected thereon. An electrical charge is developed within each of these photodetectors proportional to the quantity of incident light received by each photodetector. At periodic intervals, this charge is shifted laterally into an analog charge-transport shift register and is conveyed in bucket-brigade fashion to the edge of the array where it is amplified and presented as a series of amplitude modulated pulses to an output signal line. The shift register operation is controlled by pulses which come from an external clock.

Figure 3:
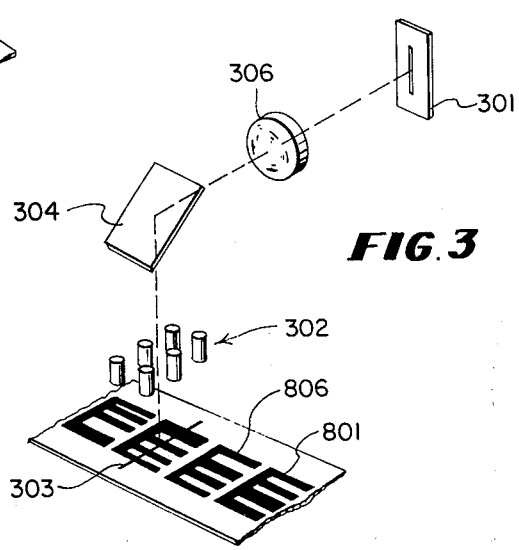
FIG. 3 is a schematic representation of the stylus shown in FIG. 1 illustrating its internal constructional details.
Figure 10:
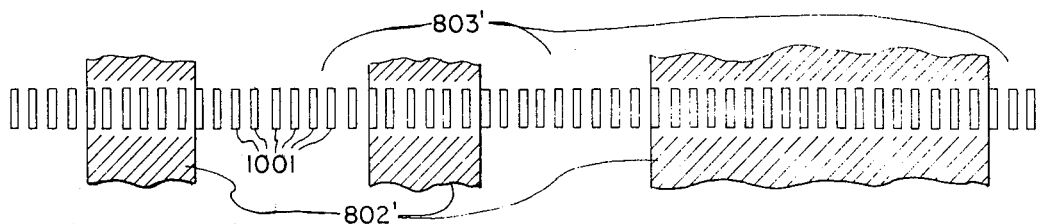
FIG. 10 illustrates an array of photodetectors upon which have been simultaneously projected an image of a series of three bars and the adjoining spaces.

Within the hand scanner 101, there may be mounted an array of light sources, for example, light emitting diodes, which are indicated generally as 302 in FIG. 3. These diodes illuminate a narrow vertical strip 303 immediately beneath the stylus 101. An image of the vertical strip 303 is reflected by a mirror 304 to a lens 306 which focuses the image of the strip 303 upon the array of photodetectors 301. FIG. 10 illustrates schematically the array of photodetectors 1001 upon which has been projected an image of the bar-encoded character 801 shown in FIGS. 1, 3 and 8. The projected image of the bars 820 results in dark regions 802' which cover some of the photodetectors 1001, while the projected image of the spaces 803 results in bright regions 803' which cover the remaining photodetectors 1001. FIG. 10 illustrates that some of the photodetectors receive light while other do not receive light, in accordance with the precise positioning of the bar code character 801 with respect to the position of the stylus 101.

Figure 11:
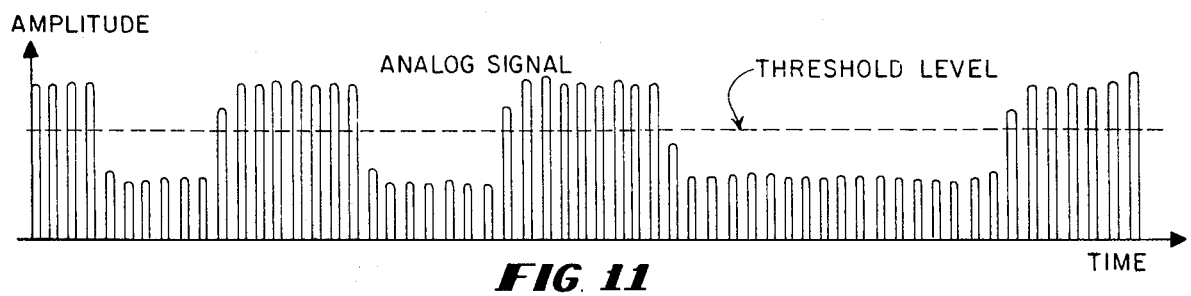
FIG. 11 illustrates the output signal which is developed when the series of photodetectors shown in FIG. 10 are scanned.

When the individual photodetectors 1001 are scanned, the resulting array output signal appears as is shown in FIG. 11. A comparison of FIGS. 10 and 11 reveals that this signal accurately depicts the light and dark regions of the bar encoded character 801. Each vertical spike in the signal shown in FIG. 11 represents the charge collected by a single photodetector, and the height of each spike indicates how much light the corresponding photodetector received during the immediately preceding period. Much higher amplitude spikes result from photodetectors upon which the space images 803' are projected than from photodetectors upon which the bar images 802' are projected. While the amplitude levels of the signals shown in FIG. 11 are preserved, the signal is somewhat quantized from left to right in that each of the spikes shown in FIG. 11 corresponds to the output of a single photodetector shown in FIG. 10. The Fairchild CCD101 image sensor separates these spikes in synchronism with the receipt of pulses from an external clock. Hence, it is possible, if one knows the geometry of the stylus 101 and the number of pulses per second supplied by the external clock, to determine precisely how wide the bars 802 and spaces 803 are by measuring the time durations of the high and low signal regions within FIG. 11. It is therefore, possible by simply timing the duration of the high and low pulse regions of the waveform shown in FIG. 11 to get a precise measurement of the absolute widths of the successive bar and space elements of each character. With a conventional hand-held stylus that contains just a single photodetector, it is in most cases impossible to measure the absolute width of bars and spaces, and only relative width measurements may be made. This requires storage of the measurements of all of the bars and spaces in a character, as described in U.S. Reissue Pat. No. Re. 28,198 so that relatively complex decoding logic is required as compared to the present invention.

Figure 4:
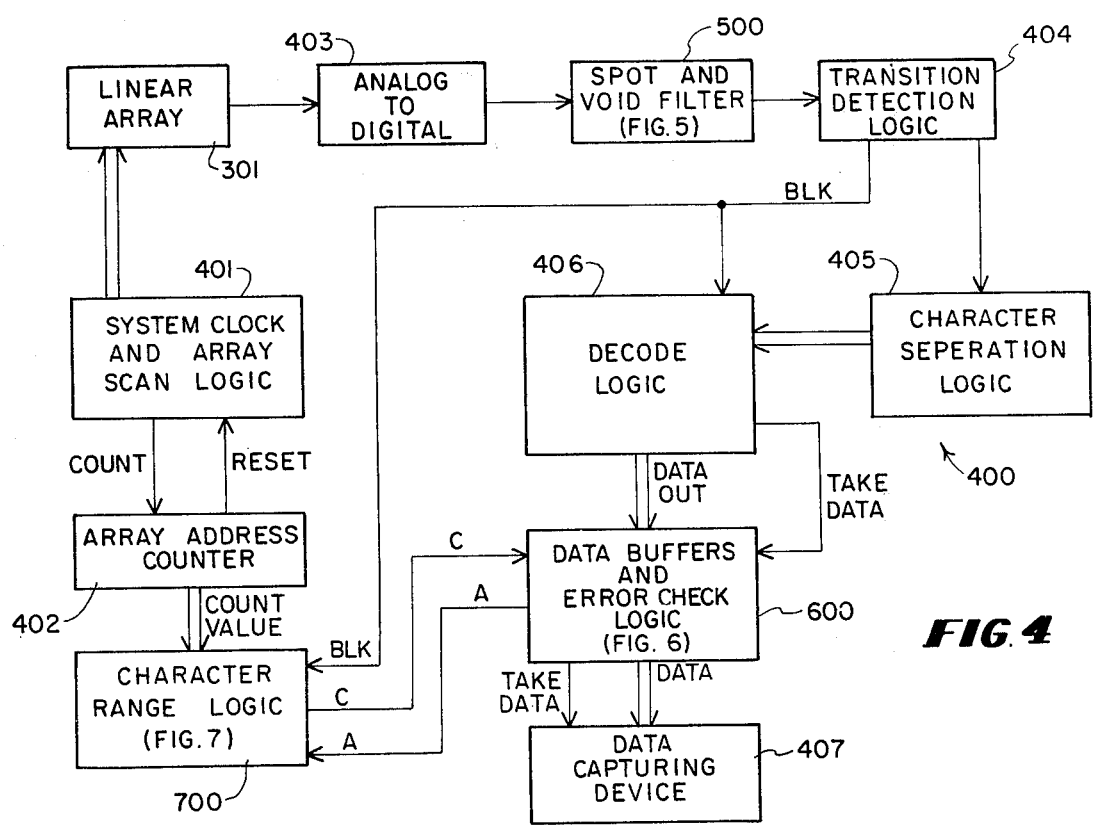
FIG. 4 is a block diagram of the preferred embodiment of the present invention.

FIG. 4 is a block diagram overview of a scanning system 400 designed in accordance with the present invention. The system 400 includes a system clock and array scan logic 401 which is used to control the operation of the linear array of photodetectors 301 mounted within the scanner 101. The details of the system clock and array scan logic 401 are conventional — it simply generates those signals which are necessary to cause the linear array of photodetectors 301 to function and to generate an output waveform such as that shown in FIG. 11 in synchronism with the operation of the system clock at 401. Schematic and logic diagrams of the required logic may be obtained, for example, from the Fairchild Semiconductor Components Group whose address is given above. The Fairchild schematic and logic diagrams would be suitable for use with the Model CCD101 image sensor device which Fairchild currently markets. If a different type of image sensor array is used, the constructional details of the necessary clock and scanning logic similarly may be obtained from the manufacturer of the linear array.

As the system clock 401 advances, it supplies pulses to an array address counter 402. The array address counter 402 generates a binary number which indicates from which photodetector within the linear array of photodetectors 301 data is being retrieved at any given moment and supplied as an output signal of the linear array. When the array address counter 402 reaches full count, it generates a reset signal which resets the system clock and erase scan logic 401 and may also initiate a new scan of the array 301. Alternatively, the system clock and array scan logic 401 may reset the array address counter after each scan is completed.

The output signal of the linear array 301 is first fed through a conventional analog-signal low-pass filter which smooths over the spikes that appear in FIG. 11. The smoothed-over signal is then fed to an analog-to-digital converter 403. The purpose of the converter 403 is to convert the variable-amplitude filtered analog signal into a two-state signal that is always either high or low and that makes clean transitions from its high state to its low state and vice versa. Such converters are well known to those skilled in the art. A typical such converter, for example, is disclosed in U.S. Pat. No. 3,849,632 which issued on Nov. 19, 1974.

The output of the analog-to-digital converter 403 is thus a signal which closely resembles the signal shown in FIG. 11 except that the higher spikes have been replaced by a continuous high-level signal and the lower spikes have been replaced by a continuous low-level signal, the high and low fluctuations of the resulting two-state signal being clean and well defined.

This two-state signal is fed into a spot and void filter 500, the details of which are shown in FIG. 5. The spot and void filter 500 is driven by a CLK signal from the system clock at 401. In the preferred embodiment of the invention, the spot and void filter 500 comprises a series of three type D flip-flops 502, 504 and 506 which are interconnected to form a three-bit shift register, as is shown. The three outputs from these flip-flops on one side are fed into an AND-gate 508 the output of which feeds the J input of a JK flip-flop 510. The three remaining outputs of the three flip-flops are fed into an AND-gate 512 which feeds the K input of the JK flip-flop 510. The system clock drives all four of the flip-flops in synchronism.

The purpose of the spot and void filter 500 is to refuse to recognize any fluctuation of the output signal delivered by the analog-to-digital converter 403 unless that fluctuation persists for at least three system clock timing intervals after it first occurs. Assuming that a high-level signal has been present at the input to the flip-flop 502 for some time, all of the flip-flops 502, 504, 506 and 510 will be in their "set" states. Assume now that the input signal to the flip-flop 502 from the analog-to-digital converter 403 now goes to a low level. The next incoming clock pulse clears the flip-flop 502 and causes it to supply a low-level signal to the AND-gate 508 and a high level signal to the AND-gate 512. The signal supplied to the AND-gate 512 is not permitted to reach the flip-flop 510 because the two flip-flops 504 and 506 continue to disable the AND-gate 512. Hence, this fluctuation of the input signal to the flip-flop 502 does not toggle the flip-flop 510 immediately. The next succeeding clock pulse clears the flip-flop 504 so that it, too, supplies a high-level signal to the AND-gate 512. However, the flip-flop 506 continues to disable the AND-gate 512. A third clock pulse finally clears the third flip-flop 506. Now the AND-gate 512 is fully enabled to supply a high-level signal to the K input of the flip-flop 510 and the next-to-occur clock pulse clears the flip-flop 510. The net result of all this is a brief time delay, but the output signal which flows from the flip-flop 510 is identical to the input signal to the flip-flop 502 in all other respects. If the input signal to the flip-flop 502 had not stayed at a low level for at least three clock pulses, the signal would have gone to a high level and permitted the flip-flop 502 to be set before the flip-flop 510 was set. The flip-flop 502 would then have disabled the AND-gate 512 and prevented the toggling of the flip-flop 510 into its cleared state. Hence a short-term low-level fluctuation of the input signal to the flip-flop 502 would have been ignored and would not have reached the output of the flip-flop 510.

Figure 9:
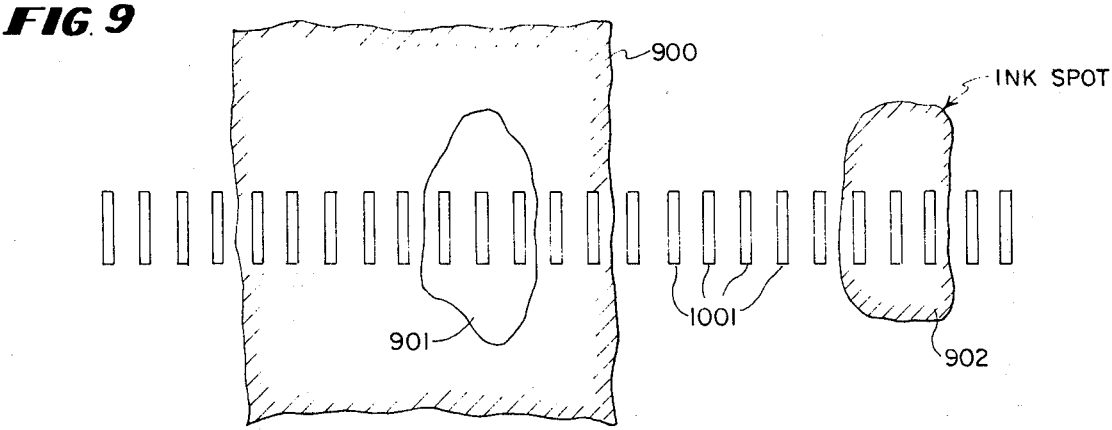
FIG. 9 illustrates the elements of a linear photodetector array upon which have been simultaneously projected a bar and the adjoining spaces to illustrate how the spot and void filter shown in FIG. 5 may be used to cancel out the signals which result from the scanning of small spots or voids within a printed bar code.

The significance of the digital-filtering arrangement just described lies in its ability to cancel out the effects of small voids and ink spots, as is apparent in FIG. 9. The array of photodetectors 1001 is therein shown as having projected upon itself a bar image 900 and images of the two adjoining spaces. The bar image 900 includes the image of a small void at 901 which is large enough to cover three of the photodetectors 1001. An ink spot at 902 within an adjoining space region is also large enough to cover three of the photodetectors 1001. When the array of photodetectors 1001 is scanned, signal fluctuations at the inputs of the spot and void filter will occur corresponding to the void 901 and the ink spot 902 which endure for only three clock pulses — the time required to scan three photodetectors — and which, therefore, are not able to toggle the flip-flop 510. Such tiny flaws within a bar-encoded character, which may not be visible to the human operator, thus cause no fluctuations of the signal which is ultimately supplied to the transition detection logic 404 (FIG. 4) and thus cannot cause an erroneous reading of the encoded data. The spot and void filter is able to distinguish a spot or void from a narrow bar or space only because the scanning carried out by the linear array is able to measure the absolute width of the spots and voids and distinguish spots and voids from bars and spaces by the narrower width of the former. Systems which measure only the relative width of spots and voids and of bars and spaces cannot distinguish spots and voids from narrow bars and spaces.

Figure 2:
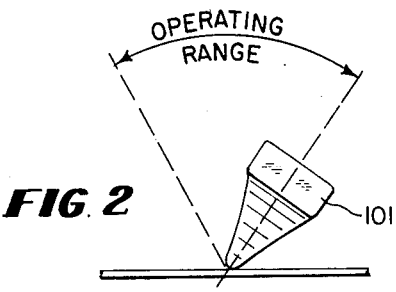
FIG. 2 is a front elevational view of the stylus shown in FIG. 1.

The output signal of the spot and void filter 500 is fed directly to the transition detection logic 404. Briefly described, the transition detection logic 404 senses fluctuations of the incoming signal and responds to such fluctuations by supplying pulses to a character separation logic 405 which includes a mechanism for measuring the time that elapses between the successive pulses and therefore between successive bar-space and space-bar transitions. The character separation logic 405 preferably compares the relative widths of the bars to each other and also compares the relative widths of the spaces to each other. The character separation logic generates digital data which indicates the results of these width comparisons (wider than, narrower than, or the same size as) and supplies this digital data to a decoding logic 406 which decodes the relative width data into the actual data content of the encoded character. The decoding logic 406 also rejects all bar-code relative width data that does not correspond to the scanning of a valid character and thus prevents, for example, a scan of the human-readable character "A" in FIG. 8 from being interpreted as a bar code. The elements 404, 405 and 406 of the present invention are conventional width-modulated bar-code decoding logic elements examples of which may be found both in U.S. Reissue Pat. No. Re. 28,198 and also in a patent application Ser. No. 399,773 filed by Arnis G. Butulis on Sept. 20, 1973 and assigned to the same assignee as the present application. Within the Butulis application, the transition-detection logic 404 is shown at the far left-hand edge of FIG. 2 wherein the signal ANALOG corresponds to the output signal of the spot and void filter 500 in the present invention. The character separation logic 405 of the present invention corresponds to the counter 114 shown in FIGS. 1 and 3 of the Butulis application and also to all of the various elements which connect Butulis' counter 114 to his two shift registers 126 and 128 which record the data defining the relative widths of bar and space elements. The decode logic 406 of the present invention corresponds to the read-only memories 130 and 138 shown in the Butulis application, although the logic used by Butulis may be simplified considerably when used in constructing the present invention because the present invention does not necessarily contemplate using start characters ahead of other characters and also because variations in the speed of manual scanning which the Butulis logic must compensate for are not present in the present invention due to the rigid control which is exercised over the speed of scanning by the system clock and array scan logic 401.

The output of the decode logic 406 is a binary representation of the data which is represented by the successive bars and spaces of a character which are scanned. That data is fed into data buffers and error-check logic 600, the details of which are shown in FIG. 6. The data is initially fed into a latch 602 which is driven by a "TAKE DATA" signal derived from logic shown in the Butulis application cited above. The "TAKE DATA" signal is generated only when a set of widths that could conceivably correspond to a valid character has been scanned. During successive scans, the "TAKE DATA" signal is repeatedly generated each time the decode logic thinks that it has again found a valid character. Each time the "TAKE DATA" signal reoccurs, the data previously stored in the latch 602 is advanced into a second latch 604, and the data content of the two latches 602 and 604 is compared by means of a binary comparator 606. A flip-flop 608 tests the result of this comparison. When the outputs of the two latches agree, the flip-flop 608 is toggled into its set state, and it releases a counter 610 so that the counter 610 may begin to count the number of recurrences of the "TAKE DATA" signal which flows to the COUNT input of the counter 610 through a gate 614.

If at any time before the counter 610 reaches full count the data presented by the latches 602 and 604 becomes nonidentical, then the output of the comparator 606 immediately flows through gates 611 and 613 and clears the counter 610 to thereby reinitiate the counting process. Assuming in a specific embodiment that the counter 610 reaches full count at a count of 4, then four successive presentations of the same identical data causes the counter 610 to reach full count and generate output signals which enable a gate 612 to generate a signal A. It should be understood however, that in many applications a single scan of data may be sufficient. The signal A disables a gate 614 and thereby locks the counter 610 at full count to prevent the signal A from terminating prematurely. The signal A also feeds a series of flip-flops 616, 618 and 620 which together generate a "TAKE DATA" pulse and supply that pulse to whatever data capturing device 407 is used in conjunction with the present invention to capture the scanned data — for example, a tape recorder or computer. Upon receipt of this "TAKE DATA" signal pulse, the device 407 accepts the data presented at the output of the latch 604 as a valid representation of a bar encoded character. It thus requires a sequence of four successive identical scans of the same character before the identification of that character is accepted as valid. With reference to FIG. 8, the presence of large voids and spots within a data character may cause numerous scans to occur during which no valid data is gathered. So long as any area within a bar-encoded character remains free to be scanned vertically at least four times without any of the scans encountering a large spot or void, the character may be accurately read. The adverse effects of small spots and voids are eliminated by the spot and void filter which has already been described.

In FIG. 6, the 0A and 0B signals shown entering the flip-flops 618 and 620 are simply interlaced clock timing pulses which are generated by circuitry disclosed in the Butulis application cited above. The flip-flops 616, 618, and 620 form in combination a simple pulse generator that generates one brief pulse each time the signal A fluctuates positively. Once the flip-flop 616 is set, it enables a 0A clock pulse to set the flip-flop 618 which in turn enables a 0B clock pulse to set the flip-flop 620. An output of the flip-flop 620 clears the flip-flop 616 which then enables a 0A clock pulse to clear the flip-flop 618. The flip-flop 618 then enables a 0B clock pulse to clear the flip-flop 620 so that the pulse-generation is completely returned to its initial state.

The signal A is fed into the character range logic 700 the details of which appear in FIG. 7. The character range logic 700 includes a shift register 702 which is supplied with data from the character separation logic 405 in serial form. This data represents the numerical width of successive bars and spaces that are scanned. In the abovementioned Butulis application, this signal is called the "X ONE" signal, and it appears in FIGS. 1 and 3 of the Butulis application. The "X ONE" signal is fed into the shift register 702 under the control of a CLK 16B data advance signal which may be obtained from FIG. 2 of the Butulis application and which flows to the shift register 702 through the gates 704 and 705. In this manner, the shift register 702 is loaded with binary data representing the actual numeric width of the bars and spaces (or light and dark regions) which have just been scanned.

When the signal A commences, it disables the gate 704 from passing the signal CLK 16B to the shift register 702. The signal A enables the clock pulses 0A generated to flow through a gate 706 to advance the stored data out of the shift register 702 and into a serial-to-parallel converter 708 which is also supplied with pulses from the output of the gate 706. When a complete record of the width of a bar or space has been fed into the converter 708, the counter 710 reaches full count and enables a gate 712 to pass a 0B clock pulse to a latch 714. The latch 714 is interconnected with an adder 716 in such a manner that it adds the width-representing-binary numbers which are successively presented by the converter 708 and thereby calculates the total numeric width of the bar-encoded character which has just been scanned. A second counter 718 counts the number of times the counter 710 reaches full count and determines when the number of widths summed by the latch 714 is equal to the number of bar and space widths in a valid bar-encoded character. The counter 718 then enables a gate 720 to pass a 0A clock pulse that sets a flip-flop 722 and also triggers a latch 724 to accept data. An output of the flip-flop 722 disables the gate 706, stops the advancement of data out of the shift register 702 and into the converter 708, and also prevents further actuation of the latch 714.

At this point, the latch 714 now contains a number proportional to the width of a complete bar-encoded character, including all of its bars and spaces.

When the signal A went high, the trailing edge of a bar-encoded character had just been scanned, and the array-address counter 402 contained a count which may be taken as an indication of the position of the trailing edge of that bar-encoded character which was just scanned. This count value was stored in a latch 726 by the onset of the signal A. An adder 728 now subtracts the binary number contained within the latch 714, representing the width of the character just scanned, from the number within the latch 726, representing the position of the trailing edge of the character just scanned. The resultant difference is stored in a latch 724 in response to the pulse 0A which is permitted to pass through the gate 720 when the counter 718 reaches full count. In this manner, the latch 724 is loaded with a numeric value that indicates the approximate position of the leading edge of the bar-encoded character just scanned, and the latch 726 remains loaded with the number indicating the approximate position of the trailing edge of the bar-encoded character just scanned. Comparators 730 and 732 are now arranged to compare the numeric values within the latches 726 and 724 to the number presented by the array address counter 402 and to generate signals which are combined by an AND-gate 734 that is enabled by the flip-flop 722 to generate a signal that goes high at times when the scan is proceeding across the region where the bars and spaces of the character just scanned were encountered. In this manner, the output signal of the gate 734 may be used to cause other logic elements within the present invention to ignore all scanning signals other than those occurring while the scanning is proceeding directly over a bar-encoded character or the space separating two such characters.

The significance and importance of this arrangement becomes apparent when one examines FIG. 8. The scanning covers not just the bars and spaces of the characters at 801 and 806 but also the printed letters 802, 807, etc. The decode logic 406 can be programmed to tell the difference between the scanning of the bar-encoded characters at 801 and the scanning of the printed letters at 802, so the fact that the letter is scanned causes no difficulty when the bar-encoded character is decoded. However, it is necessary after having accurately captured such a character to detect the wide bar 804 and the wide space 805 which separate that character from the next character. There are portions of the letter A at 802 which could easily be confused with the wide bar 804 and the immediately-following wide space 805. Hence, the output signal of the gate 734 causes the search for a wide bar followed by a wide space to be conducted only using the output of the photodetector elements that are scanning the area directly over the bar-encoded regions and the spaces between such regions. Then the printed letters cannot give a false indication that the end of a bar-encoded character has been reached.

The output of the gate 734 is used to enable a pair of gates 736 and 738 at times when the bar-encoded characters or the spaces between such characters are being scanned, and only at those times. The output of the latch 714 representing the height of a bar-encoded character is divided by four at 716 to give a numeric value proportional to one-fourth the height of a bar-encoded character. This division may be accomplished by transposing the position of the signal bits which lead from the latch 714 by four positions — thus, there may be no logic within the divide-by-four box 716, but only a shifting of signal lines by four positions. The resulting numeric value is fed into a comparator 740 which compares this value to the output of a counter corresponding to the counter 114 in the above-mentioned Butulis apparatus, which contains a count value proportional to the width of each scanned bar and space. If the numeric value within the counter 114 is greater than that presented by the divide-by-four register at 716, then it may be assumed that the scanning has proceeded until it is over the vertical bar 804 or the adjoining space 805. Hence, the signal output of the comparator 740 (signal B) goes high. This signal B is fed to the gates 736 and 738. The gate 736 is only enabled when a BLK signal is generated by the decode logic 406 (a suitable BLK signal is generated by the flip-flop 214 shown in FIG. 2 of the Butulis apparatus). Hence, when a wide black bar is encountered within the scanning range of the bar-encoded characters, the gate 736 is fully enabled to set a flip-flop 742. The flip-flop 742 then partially enables an AND-gate 744. It also supplies an enabling signal to an AND-gate 738 which initiates a similar search for the wide space 805 (FIG. 8). The absence of the signal BLK accompanied by the presence of the signal B generated by the comparator 740 and the enabling signal from the gate 734 fully enable the gate 738 to set a second flip-flop 746 to signal the scanning of a wide space. The flip-flop 746 then fully enables the gate 744 to supply an input signal to the J terminal of a flip-flop 748. A CB and a CA pulse (these pulses are staggered with respect to one another — See FIG. 2 of the above-mentioned Butulis application) cause the flip-flop 748 to be set and then cause a flip-flop 750 to be be set immediately thereafter. The setting of the flip-flop 750 clears all of the flip-flops 722, 742, 746 and 748. The next CA pulse then clears the flip-flop 750, since the flip-flop 748 has been cleared.

The signal pulse C generated by the flip-flop 750 is fed back into the data buffers and error check logic 600 (FIG. 6) where it clears the latches 602 and 604 and also clears the flip-flop 608. The signal C thereby reinitiates the search for valid character data in the next bar-encoded character which is to be scanned.

It may thus be seen that the data buffers and error check logic 600 supply successive data characters to the data capturing device 407 accompanied by TAKE DATA pulses each time the code for a new character is presented. Only one such pulse is supplied for each character captured. The entire arrangement disclosed is thus able to decode a series of bar-encoded characters and supply the decoded characters to the data capturing device 407 with a high degree of accuracy and with a low probability of either error or of completing a single horizontal swing of the stylus without capturing a complete set of data. Because the photodetector array is longer in the vertical direction than are the images of the characters which are being scanned, it is possible for the scanner 101 shown in FIG. 1 to be shifted vertically up or down over a considerable distance and to be tilted or skewed throughout a considerable angle without causing an erroneous or aborted scan. It is also possible for the horizontal speed of the scanner 101 to vary a great deal, even in the middle of a scan, without causing an erroneous scan to take plate at least so long as the scanning motion does not reverse itself. Even though the bar-encoded characters are much smaller than those which have been used previously, the present invention is still able to capture data encoded therein more accurately and much faster than was possible with prior arrangements. Data capture is almost always completed with a single pass of the stylus over the characters rather than by multiple passes of the stylus.

While the preferred embodiment of the present invention has been disclosed, it will be understood that numerous modifications and changes will occur to those skilled in the art. It is, therefore, intended by the appended claims to encompass the true spirit and scope of the invention claimed.

What is claimed as new and desired to be secured by Letters Patent of the United States is:

1. An apparatus for reading and interpreting a bar-encoded record bearing a group of substantially parallel, scannable bars having distinctive light reflective characteristics and whose widths represent encoded data, said apparatus comprising:

light responsive means including a linear series of photodetectors arranged along a single straight line for generating a signal whose amplitude fluctuations reflect the spatial variations of the incident light intensity along said series of photodetectors;

means for simultaneously projecting an image of the record onto said series of photodetectors, said record image being along a line generally perpendicular to said group of bars; and decoding means attached to said light responsive means for decoding the amplitude fluctuations of said signal into data.

2. An apparatus in accordance with claim 1 wherein said light responsive means includes an analog charge-transport shift register connecting said series of photodetectors to said decoding means, and means for periodically causing said shift register to convey charges from said series of photodetectors to said decoding means in sequence to thereby form said signal whose amplitude fluctuations with time reflect the spatial variations of the incident light intensity along said series of photodetectors.

3. An apparatus as set forth in claim 1, wherein said decoding means includes means for identifying that group of photodetectors within said series of photodetectors which are responsive to light reflected from said group of bars, and area control means for thereafter causing said decoding means to respond only to the output of said group of photodetectors within said series of photodetectors.

4. An apparatus for extracting information from a scannable, bar-encoded record having predetermined characteristics whereon groups of plural bars are spaced apart in a first direction, leaving a space between adjacent groups, and whereon the plural bars within each such group are spaced out in a second direction substantially perpendicular to said first direction, the bars within each such group also being adjacent, parallel, variable-width bars arranged so that adjoining bars have predetermined characteristics, said apparatus comprising:

scanning means for scanning said record in a direction generally parallel to said second direction with successive scans passing over said record at locations spaced apart in said first direction such that each group of bars is scanned a plurality of times and the space between each group of bars is scanned at least once, said scanning means generating a signal whose fluctuations with time represent the width variations of the bars and spaces scanned;

decoding means attached to said scanning means for decoding the fluctuations of said signal resulting from scans across the full width of each bar in a group of bars into a data set;

a data utilization device;

error check means accepting data sets from said decoding means for comparing successive data sets produced by said decoding means and for supplying a single data set to said data utilization device after receiving identically the same data set from said decoding means a predetermined number of times; and means placed in operation by said error check means after said error check means has supplied a data set to said data utilization device for preventing additional data sets from reaching said data utilization device from said error check means until after a predetermined duration fluctuation of the signal generated by said scanning means occurs, said predetermined duration fluctuation signal indicating that the scanning means is scanning the space separating two groups of characters from each other.

5. An apparatus for extracting information from an optically-scannable, bar-encoded record wherein groups of plural bars are spaced apart in a first direction and are separated by at least two optically dissimilar regions, said two optically dissimilar regions being separated from each other by a border substantially perpendicular to said first direction, and whereon the plural bars within each such group are spaced out in a second direction substantially perpendicular to said first direction, the bars in each such group also being adjacent, parallel, variable-width bars arranged so that adjoining bars are optically dissimilar, said apparatus comprising:

scanning means for optically scanning said record in a direction roughly parallel to said second direction with successive scans passing over said record at locations spaced apart in said first direction such that each group of bars is scanned a plurality of times and the regions separating groups of bars are each scanned at least once over a predetermined portion of their lengths, said scanning means generating a signal whose fluctuations with time represent the width of the bars and regions scanned;

decoding means attached to said scanning means for decoding the fluctuations of said signal resulting from scans across the full width of each bar in a group of bars into a data set;

a data utilization device;

error check means for accepting data sets from said decoding means for comparing successive data sets produced by said decoding means and for supplying a single data set to said data utilization device after receiving identically the same data set from decoding means a predetermined number of times greater than once; and means placed in operation by said error check means after said error check means has supplied a data set to said data utilization device for preventing additional data sets from reaching said data utilization device from said error check means until after a predetermined duration fluctuation of the signal generated by said scanning means occur corresponding to each of the optically dissimilar regions between groups of plural bars, said predetermined duration fluctuation signal being longer in duration than any of said signals representing a bar scan and indicating that the scanning has progressed from one group of bars to the next.

6. An apparatus for extracting information from a bar-encoded record having distinctive scannable characteristics and wherein groups of plural bars are spaced apart in a first direction, leaving a space between groups, and wherein the plural bars within each such group are spaced out in a second direction substantially perpendicular to said first direction, the bars within each such group also being adjacent, parallel, variable-width bars arranged so that adjoining bars are of two distinct scannable characteristics, and wherein the spaces between groups of bars contain identical scannable patterns having characteristics different from those of the bars in any of said groups, said apparatus comprising:

scanning means for scanning said record in a direction generally parallel to said second direction with successive scans passing over said record at locations spaced apart in said first direction such that each group of bars is scanned a plurality of times and the patterns between each group of bars are also scanned, said scanning means generating a signal whose fluctuations with time represent the width variations of the bars and patterns scanned;

decoding means attached to said scanning means for decoding the fluctuations of said signal resulting from scans across the full width of each bar in a group of bars into a data set;

error check means accepting data sets from said decoding means for comparing successive data sets produced by said decoding means and for supplying a single data set to said data utilization device after receiving identically the same data set from said decoding means a predetermined number of times greater than once; and means placed in operation by said error check means after said error check means has supplied a data set to said data utilization means for preventing additional data sets from reaching said data utilization device from said error check means until the signal generated by said scanning means fluctuates in a manner indicative that a pattern of the type found between groups of data bars is being scanned.

7. Apparatus for extracting information from a scannable, bar-encoded record whereon groups of plural bars are spaced apart in a first direction and are separated by a pair of separation bars having first and second predetermined characteristics respectively and oriented substantially perpendicular to said first direction, and whereon the plural bars within each such group are spaced out in a second direction substantially perpendicular to said first direction, the bars in each such group being adjacent and having the same alternating first and second characteristics as the separation bars between the groups of bars, each group including a fixed number of bars whose width variations represent data, said data including data values to be conveyed and redundant data for error checking, said apparatus comprising:

scanning means for scanning said record in a direction generally parallel to said second direction with successive scans of said record occurring at locations spaced apart in said first direction such that each group of bars is scanned a plurality of times and the separation bars between the groups are also scanned, said scanning means generating a signal whose fluctuations with time represent the width variations of the bars or portions thereof scanned;

decoding means attached to said scanning means for decoding the fluctuations of said signal resulting from scans across the full width of each bar in a group of bars into a data set, said decoding means sensing improper redundant data in other scans and not responding to such other scans;

error check means accepting data sets from said decoding means for comparing successive data sets produced by said decoding means and for supplying a single data set to said data utilization device after receiving identically the same set from said decoding means a predetermined number of times; and means placed in operation by said error check means after said error check means has supplied a data set to said data utilization means for preventing additional data sets from reaching said data utilization device until a signal generated by said scanning means generates fluctuations of predetermined durations of a first predetermined state followed by a second predetermined state representing the scanning of the separation bars.

8. A method for extracting information from a scannable, bar-encoded record whereon groups of plural bars having predetermined distinctive characteristics are spaced apart in a first direction and are separated by identical scannable patterns having predetermined characteristics distinguishable from those of the bars in any of said groups, and whereon the plural bars within each such group are spaced out in a second direction substantially perpendicular to said first direction, the bars within each such group also being adjacent, parallel, variable-width bars arranged so that adjoining bars are of two distinct predetermined characteristics, said method comprising the steps of:

scanning said record in a direction generally parallel to said second direction with successive scans of said record occurring at locations spaced apart in said first direction such that each group of bars is scanned several times and such that the patterns separating groups of bars are also scanned for recognition, and generating a signal whose fluctuations with time represent the fluctuations with distance of the characteristics of the bars and other patterns scanned;

converting the signal fluctuations with time into digital code values by assigning a code value to each predetermined signal fluctuation pattern encountered during a scan, said conversion into digital code values being performed only when a signal fluctuation pattern is determined to have been caused by the complete scanning of all the bars in a group;

accepting that digital code value as a valid representation of data encoded into a single group of bars after the same digital code value has been obtained by the above conversion step a predetermined number of times in succession; and discontinuing the above signal conversion process after accepting a digital code value until the signal fluctuations with time are fluctuations recognizable as the scanning of the pattern that separates two groups of bars whereupon the above signal conversion process is reinitiated until all the groups of bars on the record have been scanned.

9. A method for scanning and decoding information from a coded record having a series of areas positioned along a scanning path, each area comprising two groups of segments having different characteristics which are alternated in a first direction, said groups of segments in each area are spaced out in a second direction substantially perpendicular to said first direction, the segments within each of said areas being adjacent parallel, variable-width bars, said method comprising the steps of:

scanning said record in a direction generally parallel to said second direction such that a representation of the record along a line generally perpendicular to said scanning direction is simultaneously presented of the entire variable-width bar pattern of the area being scanned;

generating a signal whose transitions with respect to time are representations of the characteristics of the bars of the area being scanned;

and converting said signal into a digital code representation of data encoded into the area of bars being scanned.

10. A coded record for reading by relative movement between the record and a reader along a path comprising, a record member with a surface of a first light reflecting characteristic, a series of fields representing different characters in a character set and extending along said path, each of said fields including a plurality of areas on said surface spaced from one another along a line perpendicular to said path and having a second light reflecting characteristic, said areas being of predetermined widths and being spaced from each other by predetermined distances to define areas on said surface of said first light reflecting characteristic which have predetermined widths to provide a coded representation of a character, each of said fields including an additional area on said surface of said second light reflecting characteristic extending along said line perpendicular to said path and of a length equal to the combined widths of all of said areas of first and second light reflecting characteristics, said additional area in each of said fields being connected to said plurality of areas in the same field.

11. A hand held scanner for reading a coded record having a series of areas corresponding to different characters, said areas being positioned along a scanning path and each comprising two groups of segments having different characteristics which are alternated with one another in a direction perpendicular to said path, comprising a housing, a series of photosensitive devices arranged in a single line within said housing which is generally perpendicular to said path as said scanner is moved along said path, light source means within said housing and arranged to illuminate a coded record, and means for directing light reflected from the record along a line perpendicular to said path onto said linear array of photosensitive devices in such manner that said devices are simultaneously responsive to light reflected from different points on the record along said line.

12. The combination of claim 11, wherein said housing has a generally V-shaped cross sectional profile in a plane perpendicular to said line of photosensitive devices, whereby said housing may be tilted a substantial amount on either side of a vertical plane passing through the apex of said V so that said scanner may be used for either right hand or left hand operation.

13. The combination of claim 12, wherein said housing is provided with a narrow elongated slot along the bottom edge of said V-shaped profile for illuminating the record along a line perpendicular to said path, said linear array of photosensitive devices is positioned in a plane perpendicular to said slot, and optical means for directing light reflected from the record in the vicinity of said slot onto all of said photosensitive devices simultaneously.

14. The combination of claim 11, which includes optical means for focusing an image of the surface of the coded record along said perpendicular line onto said linear array of photosensitive devices.

15. The combination of claim 11, wherein said light source means comprises a plurality of light emitting diodes arranged to provide substantially uniform illumination of the record surface along said perpendicular line said plurality of diodes being substantially fewer in number than said series of photosensitive devices.

16. A system for interpreting a record encoded with a series of areas corresponding to different characters, said areas being positioned along a scanning path and each comprising two groups of segments having different characteristics which are alternated with one another in a direction perpendicular to said path, the segments in at least one of said groups having predetermined widths in said perpendicular direction to provide a coded representation of a character, a linear series of photosensitive devices, means for mounting said series of devices in a single line so that they may be moved as a unit along said path while said line is generally perpendicular to said path, said devices being simultaneously sensitive to light from different points on a record along said line during movement along said path, means for developing a series of electrical signals corresponding to the light received by each of said series of devices, and means responsive to said electrical signals for developing digital signals corresponding to the width of said segments.

17. The combination of claim 16, wherein said series of electrical signals are repetitively produced a number of times during relative movement over a single one of said areas, whereby successive groups of said digital signals corresponding to a single one of said characters are developed.

18. A system for interpreting a record encoded with a series of areas corresponding to encoded data positioned along a scanning path, each area comprising at least two groups of segments having different predetermined characteristics which are alternated with one another in a direction generally perpendicular to said path, the segments in at least one of said groups having variable predetermined widths in said perpendicular direction to provide a coded representation of data, means for scanning said record in a direction generally parallel to said scanning path such that a representation of the record along said direction perpendicular to said scanning path is simultaneously presented of the entire variable width pattern of the area being scanned, and means responsive to said scanning means for interpreting said variable width pattern record representation and for generating an electrical signal representing the pattern of variable width segments along said perpendicular direction.

19. The combination of claim 18, wherein said interpreting means comprises a linear series of photosensitive devices and said scanning means comprises means for mounting said linear array to be movable as a unit along said scanning path.

20. The combination of claim 18 wherein said scanning means further scans said record in said perpendicular direction with successive scans of said record occurring at locations spaced apart along said scanning path such that each area of segments is scanned a plurality of times.

21. The combination of claim 18 further comprising decoding means responsive to said generated electrical signal representing the pattern of said area being scanned for developing digital signals corresponding to the width of said segments whereby successive digital signals correspond to the information encoded in said area being scanned.

22. An apparatus for reading and interpreting a bar-encoded record bearing a series of substantially parallel, adjacent, scannable bars having distinctive light reflective characteristics and whose widths represent encoded data, said apparatus comprising:

light responsive means including a linear array of photodetectors for generating a signal whose amplitude fluctuations reflect the spatial variations of the incident light intensity along said array;

means for simultaneously projecting an image of the record into said array, said record image being along a line generally perpendicular to said series of bars; and decoding means attached to said light responsive means for decoding the amplitude fluctuations of said signal into data; and error check means for comparing successive sets of data produced by said decoding means, said error check means rejecting any data which is not successively produced by said decoding means a predetermined number of times without alteration.

23. An apparatus for reading and interpreting a bar-encoded record bearing a series of substantially parallel, adjacent, scannable bars having distinctive light reflective characteristics and whose widths represent encoded data, said apparatus comprising:

light responsive means including a linear array of photodetectors for generating a signal whose amplitude fluctuations reflect the spatial variations of the incident light intensity along said array;

means for simultaneously projecting an image of the record onto said array, said record image being along a line generally perpendicular to said series of bars; and decoding means attached to said light responsive means for decoding the amplitude fluctuations of said signal into data; and spot and void filter means interposed between said light responsive means and said decoding means for cancelling any fluctuation of said signal whose time duration is shorterthan a predetermined minimum value, thereby preventing small defects in the scanned record from being interpreted as encoded data.

24. A method for scanning and decoding information from a coded record having a series of areas positioned along a scanning path, each area comprising two groups of segments having different characteristics which are alternated in a first direction, said groups of segments in each area are spaced out in a second direction substantially perpendicular to said first direction, the segments within each of said areas being adjacent parallel, variable-width bars, said areas being separated by identical scannable patterns having predetermined characteristics distinguishable from the segments in any of said areas, said method comprising the steps of:

scanning said record in a direction generally parallel to said second direction such that a representation of the record along a line generally perpendicular to said scanning direction is simultaneously presented of the entire variable-width bar pattern of the area being scanned;

generating a signal whose transitions with respect to time are representations of the characteristics of the bars of the area being scanned;

converting said signal into a digital code representation of data encoded into the area of bars being scanned;

scanning and recognizing said patterns separating said areas; and generating a signal indicating the end of an area and the beginning of the next successive area in the direction of scanning.

25. A system for interpreting a record encoded with a series of areas corresponding to encoded data positioned along a scanning path, each area comprising at least two groups of segments having different predetermined characteristics which are alternated with one another in a direction generally perpendicular to said path, the segments in at least one of said groups having variable predetermined widths in said perpendicular direction to provide a coded representation of data, said areas of said coded record being separated by identical scannable patterns having first predetermined characteristics distinguishable from those of said segments in any of said areas and having second distinguishable characteristics which are the same as those of said segments, means for scanning said record in a direction generally parallel to said scanning path such that a representation of the record along said direction perpendicular to said scanning path is simultaneously presented of the entire variable width pattern of the area being scanned, means responsive to said scanning means for interpreting said variable width pattern record representation and for generating an electrical signal representing the pattern of variable width segments along said perpendicular direction;

decoding means responsive to said generated electrical signal representing the pattern of said area being scanned for developing digital signals corresponding to the width of said segments whereby successive digital signals correspond to the information encoded in said area being scanned;

means for generating signals representative of said separating patterns, and means responsive to said last named generated electrical signals for detecting the scanning of said separating patterns indicating the end of one area and the beginning of the next successive adjacent area in the scanning direction.

26. The combination of claim 25 wherein said separating pattern associated with each area includes a first separation bar connecting each of said variable width segments and extending along said direction perpendicular to said scanning path and a second separation bar having characteristics of said second type distinguishable from said first separating bar and immediately following said first separation bar and extending along said direction perpendicular to said scanning path, said detecting means further comprising:

means for generating a first separation signal upon the detection of said first separation bar of the area being scanned, said characteristic of said first type being the length or width along said perpendicular direction, said detection of said first separation bar determined by the detection of the length of said first separation bar as being greater than the width of any of the segments;

means for generating a second separation signal after the occurrence of said first separation signal and upon the detection of said second separation bar, said detection of said second separation bar determined by the detection of the length of said second separation bar as being greater than the width of any of the segments and by said second separation bar being distinghishable from said first bar, according to said characteristic of said second type, and means responsive to said first separation signal generating means and said second separation signal generating means for generating an end of area signal to control said decoding means to initiate the scan for the next successive area of segments immediately adjacent said area previously scanned along said scanning path.

27. The combination of claim 26, wherein said decoding means further comprises means for generating an area border signal to control said detecting means to operate only within the boundaries of said areas scanned as defined by the overall width of said segments within said areas, said area border signal being generated only after at least one complete decoding of the data encoded within said variable width segment has been verified.

28. A coded record for reading by relative movement between the record and a reader along a path comprising, a record member with a surface of a first light reflecting characteristic, a series of fields representing different characters in a character set and extending along said path, each of said fields including a plurality of areas on said surface spaced from one another along a line perpendicular to said path and having a second light reflecting characteristic, said areas being of predetermined widths and being spaced from each other by predetermined distances to define areas on said surface of said first light reflecting characteristic which have predetermined widths to provide a coded representation of a character, each of said fields including an additional area on said surface of said second light reflecting characteristic extending along said line perpendicular to said path and of a length equal to the combined widths of all of said areas of first and second light reflecting characteristics.

29. An apparatus for extracting information from a scannable, bar-encoded record having predetermined characteristics whereon groups of plural bars are spaced apart in a first direction, leaving a space between adjacent groups, and whereon the plural bars within each group are spaced out in a second direction substantially perpendicular to said first direction, the bars within each such group also being adjacent, parallel, variable-width bars, said apparatus comprising:

scanning means for scanning said record in a direction generally parallel to said second direction with successive scans passing over said record at locations spaced apart in said first direction such that each group of bars is scanned a plurality of times and the space between each group of bars is scanned at least once, said scanning means generating a signal whose fluctuations with time represent the width variations of the bars and spaces scanned;

decoding means attached to said scanning means for decoding the fluctuations of said signal resulting from scans across the full width of each bar in a group of bars into a data set;

a data utilization device; and error check means accepting data sets from said decoding means for comparing successive data sets produced by said decoding means and for supplying a single data set to said data utilization device after receiving identically the same data set from said decoding means a predetermined number of times.

* * * * *